United States Patent [19]
Sudo

[11] Patent Number: 5,912,702
[45] Date of Patent: Jun. 15, 1999

[54] VIDEO CAMERA AND IMAGE ENHANCING APPARATUS

[75] Inventor: Fumihiko Sudo, Kanagawa, Japan

[73] Assignee: Sony Corporation, Tokyo, Japan

[21] Appl. No.: 08/760,930

[22] Filed: Dec. 6, 1996

[30]    Foreign Application Priority Data

Dec. 12, 1995  [JP]  Japan .................................. 7-346397

[51] Int. Cl.$^6$ ............................ H04N 9/68; H04N 5/208; H04N 5/21
[52] U.S. Cl. ......................... 348/234; 348/252; 348/625
[58] Field of Search ..................................... 348/223, 225, 348/228, 257, 259, 234, 252, 235, 625

[56]               References Cited

U.S. PATENT DOCUMENTS

| | | | |
|---|---|---|---|
| 4,876,599 | 10/1989 | Kihara ..................................... | 358/162 |
| 5,103,299 | 4/1992 | Asaida ..................................... | 358/37 |
| 5,255,081 | 10/1993 | Miyamoto et al. ....................... | 358/41 |
| 5,349,381 | 9/1994 | Murayama et al. ..................... | 348/252 |
| 5,661,522 | 8/1997 | Tomizuka ................................ | 348/262 |

FOREIGN PATENT DOCUMENTS 1-238280  9/1989  Japan .

*Primary Examiner*—Wendy Garber
*Assistant Examiner*—Jacqueline Wilson
*Attorney, Agent, or Firm*—Frommer Lawrence & Haug, LLP.; William S. Frommer; Dennis M. Smid

[57]                ABSTRACT

A video camera and an image enhancing apparatus which can add details without deteriorating an S/N ratio near the black level are provided. The video camera is constructed by: an image pickup device for photographing an object and generating a video signal; a signal level detecting circuit for detecting a signal level of DC components of the video signal; a detail signal forming circuit for forming a detail signal to correct an outline of an image which is expressed by the video signal by extracting partial frequency components in the video signal from the video signal; a control unit for controlling the detail signal forming circuit on the basis of an output of the signal level detecting circuit in a manner such that as a signal level of the DC components is low, frequency of the detail signal to be formed by the detail signal forming circuit becomes lower; and a mixing circuit for mixing the detail signal to the video signal.

13 Claims, 14 Drawing Sheets

Fig. 6

2MHz: (−1, −2, −2, −1, 0, 0, 1, 2, 3, 4, 3, 2, 1, 0, 0, −1, −2, −2, −2, −1)/16

3MHz: ( 0, 0, 0, −2, −3, −2, −1, 1, 2, 3, 4, 3, 2, 1, −1, −2, −3, −2, 0, 0)/16

4MHz: ( 0, 0, 0, 0, 0, −2, −5, −1, 2, 3, 6, 3, 2, −1, −5, −2, 0, 0, 0, 0)/16

5MHz: ( 0, 0, 0, 0, 0, 0, −1, −2, −1, 2, 4, 2, −1, −2, −1, 0, 0, 0, 0, 0)/ 8

6MHz: ( 0, 0, 0, 0, 0, 0, 0, −1, −1, 1, 2, 1, −1, −1, 0, 0, 0, 0, 0, 0)/ 4

7MHz: ( 0, 0, 0, 0, 0, 0, 0, −1, −3, 1, 6, 1, −3, −1, 0, 0, 0, 0, 0, 0)/ 8

8MHz: ( 0, 0, 0, 0, 0, 0, 0, −1, −7, 1, 14, 1, −7, −1, 0, 0, 0, 0, 0, 0)/16

9MHz: ( 0, 0, 0, 0, 0, 0, 0, 0, −1, 0, 2, 0, −1, 0, 0, 0, 0, 0, 0, 0)/ 2

*Fig. 8*

1MHz: ( 3, 2, 2, 3, 3, 3, 4, 4, 4, 4, 4, 4, 3, 3, 2, 2, 3)/64

2MHz: ( 1, 2, 3, 3, 4, 5, 6, 6, 6, 5, 4, 3, 3, 2, 1)/64

3MHz: ( 1, 1, 2, 2, 2, 2, 1, 1, 1)/16

Fig. 9A VL
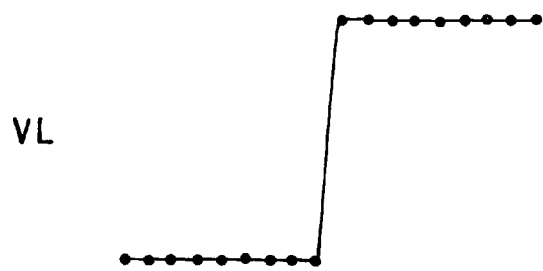
Fig. 9B VLHH1
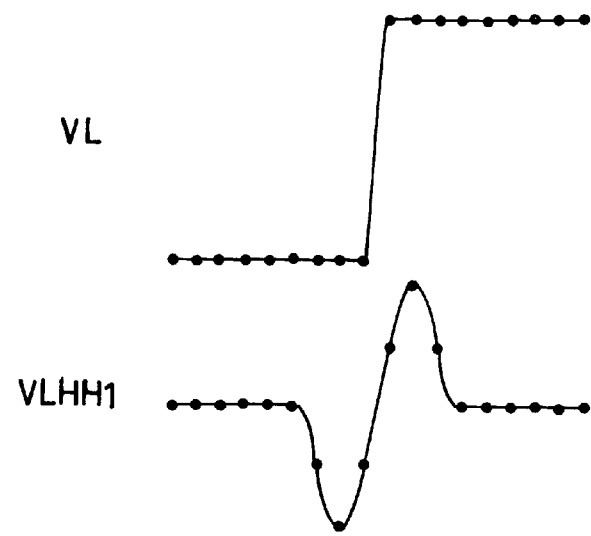
Fig. 9C VLHH2
Fig. 9D VLHL
Fig. 9E LD1
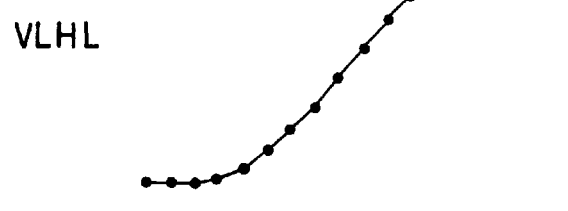
Fig. 9F VLHH

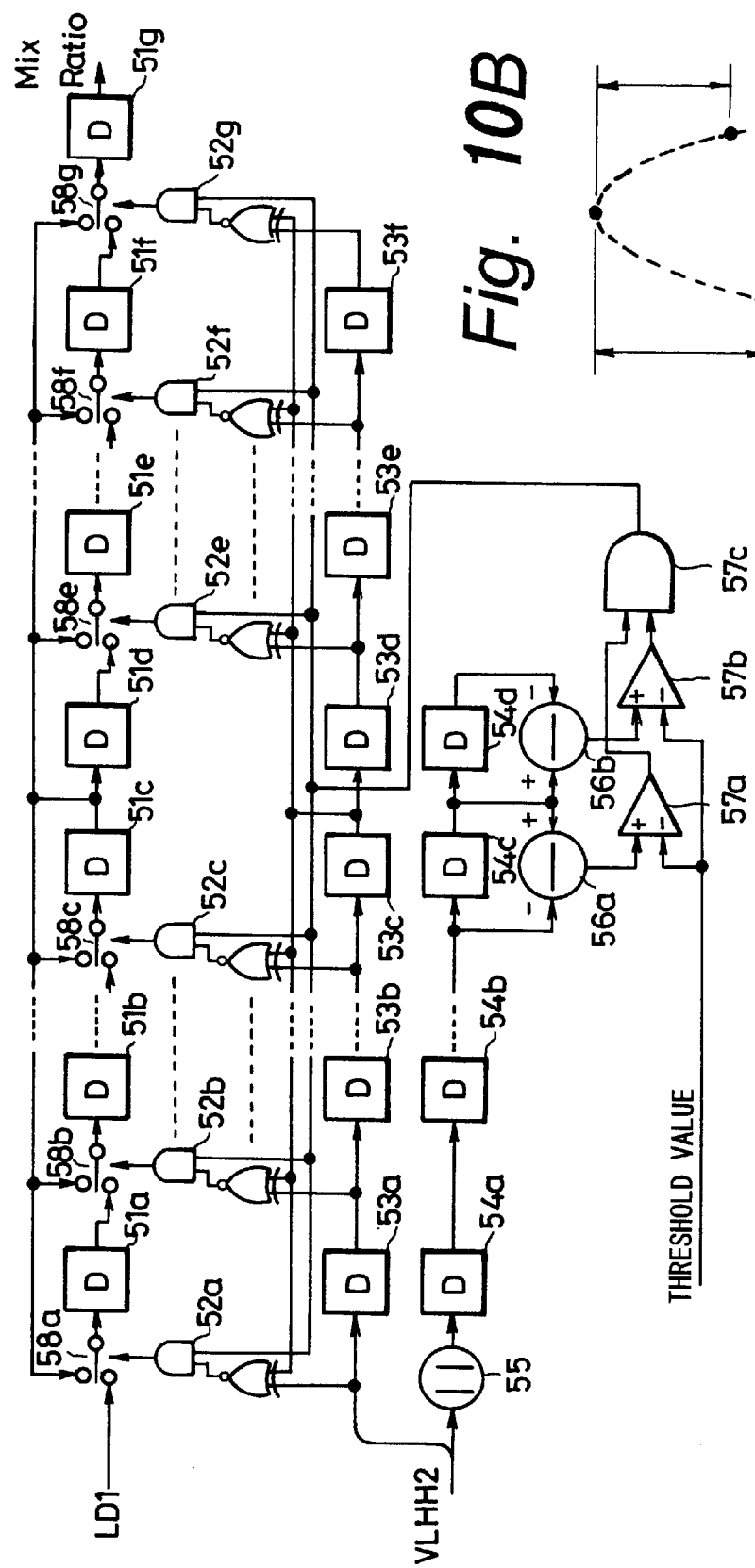
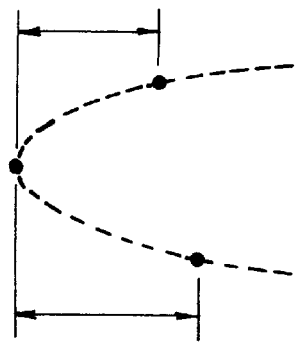

γ CURVE

Fig. 17A
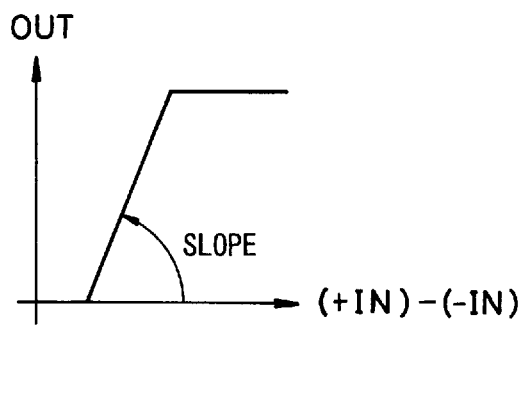
Fig. 17B
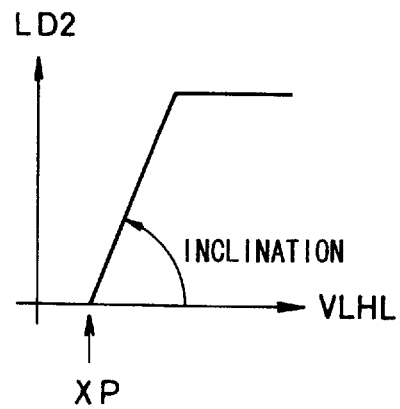
Fig. 18A
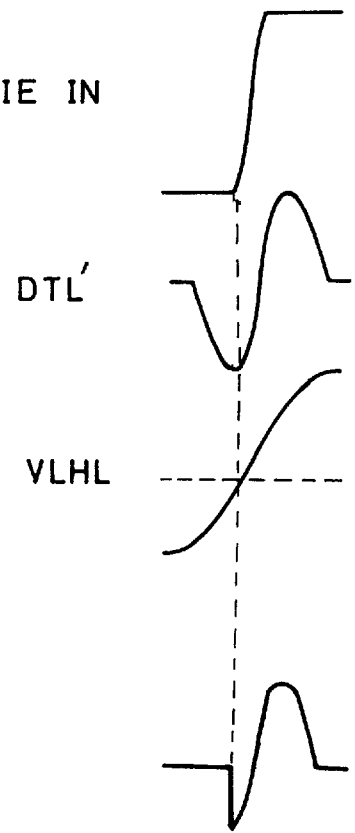
Fig. 18B

VIDEO CAMERA AND IMAGE ENHANCING APPARATUS

BACKGROUND OF THE INVENTION

1. Field of the Invention

The invention relates to an image enhancing apparatus which varies frequency characteristics of a detail signal in accordance with a level of a luminance signal and a video camera having such an image enhancing apparatus.

2. Description of the Related Art

As an image enhancing apparatus which is used in a signal processing circuit of a video camera, an apparatus with a construction as shown in FIG. 1 has conventionally been used. In FIG. 1, delay outputs of 0H (this means that a delay amount is equal to 0), 1H, and 2H of a red signal R are respectively supplied to an HPF (high pass filter) 21a and an LPF (low pass filter) 21b in the vertical direction. Delay outputs of 0H, 1H, and 2H of a green signal G are respectively supplied to an HPF 22a and an LPF 22b in the vertical direction. Further, delay outputs of 0H, 1H, and 2H of a blue signal B are respectively supplied to an HPF 23a and an LPF 23b in the vertical direction.

The HPFs 21a, 22a, and 23a form high frequency signals in the vertical direction of chrominance signals. Output signals of the HPFs 21a, 22a, and 23a are mixed by a mixer 24a at a predetermined mixture ratio. A vertical high band signal VH from the mixer 24a is transmitted through an LPF 25 in the horizontal direction, so that vertical high band•horizontal low band signal VHHL is formed and supplied to a mixer 30.

The LPFs 21b, 22b, and 23b in the vertical direction form low frequency signals in the vertical direction of the chrominance signals. Output signals of the LPFs 21b, 22b, and 23b are mixed by a mixer 24b at a predetermined ratio. A vertical low band signal VL from the mixer 24b is transmitted through a BPF (band pass filter) 26 in the horizontal direction, so that a vertical low band•horizontal high band signal VLHH is formed. The BPF 26 is constructed so that a center frequency (ordinarily, about 2 to 8 MHz) can be varied by a manual adjustment in accordance with a taste of the user or a feature of an image which was photographed. The signal VLHH is supplied to the mixer 30. The mixer 30 adds the vertical high band•horizontal low band signal VHHL and vertical low band•horizontal high band signal VLHH. The added output signal is supplied to a multiplier 27.

The vertical low band signal VL from the mixer 24b is supplied to an LPF 28 in the horizontal direction. A vertical low band•horizontal low band (DC components) VLHL is formed by the LPF 28. The signal VLHL is supplied to a non-linear circuit 29. For example, the non-linear circuit 29 has a comparator and has non-linear input-output characteristics and executes a non-linear process so that a level near a black level of an input signal is set to 0 and a level that is equal to or higher than a predetermined level is set to 1. Such a process is "level dependent". An output signal of the non-linear circuit 29 is supplied to the multiplier 27. A gain of an output signal of the mixer 30 is controlled by the multiplier 27. A detail signal DTL is taken out from an output terminal 31.

Since a 1H delay line has a large circuit scale and is expensive, it is also possible to use such a delay line for only the G channel or for only the G and R channels and to form the vertical high band•horizontal low band signal VHHL and vertical low band•horizontal high band signal VLHH. In such a case, the LPF in the vertical direction is not provided for a channel without the 1H delay line but the signals are directly supplied to the mixers 24a and 24b for details in the horizontal direction. In FIG. 1, blocks 21a, 21b, 23a, and 23b surrounded by broken lines show circuit blocks which can be omitted in case of using only the G channel.

In the conventional image enhancing apparatus as mentioned above, a gain of the detail signal near the black level is reduced, thereby preventing a deterioration of an S/N ratio. However, in a digital signal processing camera, a problem such that when noises near the black level are removed, the details are deleted and when the details are not deleted, the noises become conspicuous occurs.

In a video camera, a gamma correcting circuit is ordinarily provided. According to input/output characteristics of the gamma correcting circuit, since a gain is large for an input at a low level, as for an image pickup signal, a video level of the input near the black level is amplified to about four times by a gamma correction. The same shall also similarly apply to a case where the detail signal formed by the image enhancing apparatus passes through such a gamma correcting circuit. Thus, the S/N ratio deteriorates and noises near the black level are further conspicuous for the human eyes.

In the conventional image enhancing apparatus mentioned above, therefore, the DC components transmitted through the non-linear circuit 29 are supplied to the multiplier 27 and the gain of the detail signal is controlled, thereby reducing a gain of the details near the black level. Such a process is called a "level dependent". In an analog circuit, generally, since the product of G (gain) and B (band width) is constant, when the gain of the gamma correcting circuit near the black level rises, the band width is narrowed and the high frequency components also naturally decrease. Therefore, there is no need to largely make the "level dependent" effective.

Different from the analog circuit, however, in the digital circuit, even if the gain near the black level is raised by the gamma correcting circuit, frequency characteristics are not changed. Namely, the high frequency components don't decrease, high frequency noises are increased by only an amount corresponding to the increased gain, and the "level dependent" has to be strongly made effective. However, when the "level dependent" is excessively made effective, the detail signal near the black level is hardly extinguished and an image becomes very unnatural. For example, when a bright image and a dark image exist, a phenomenon such that the detail signal is added to only the bright image occurs.

OBJECTS AND SUMMARY OF THE INVENTION

It is, therefore, an object of the invention to provide a video camera and an image enhancing apparatus which can add details without deteriorating an S/N ratio near the black level.

According to the invention, there is provided a video camera comprising:

image pickup means for imaging an object and generating a video signal;

signal level detecting means for detecting a signal level of DC components of the video signal;

detail signal forming means for forming a detail signal to correct an outline of an image which is expressed by the video signal by extracting partial frequency components in the video signal from the video signal;

control means for controlling the detail signal forming means on the basis of an output of the signal level detecting means in a manner such that as a signal level of the DC components is low, frequency of the detail signal to be formed by the detail signal forming means becomes lower; and mixing means for mixing the detail signal to the video signal.

According to the invention, there is provided a video camera comprising:

image pickup means for imaging an object and generating a video signal;

signal level detecting means for detecting a signal level of DC components of the video signal;

detail signal forming means for forming a detail signal from the video signal;

control means for controlling the detail signal forming means on the basis of an output of the signal level detecting means in a manner such that as the signal level of the DC components is low, a boost frequency of the detail signal to be formed by the detail signal forming means becomes lower; and mixing means for mixing the detail signal to the video signal.

Further, according to the invention, there is provided an image enhancing apparatus of a video signal comprising:

signal level detecting means for detecting a signal level of DC components of a video signal;

detail signal forming means for forming a detail signal to correct an outline of an image which is expressed by the video signal by extracting partial frequency components in the video signal from the video signal;

control means for controlling the detail signal forming means on the basis of an output of the signal level detecting means in a manner such that as a signal level of the DC components is low, frequency of the detail signal to be formed by the detail signal forming means becomes lower; and mixing means for mixing the detail signal to the video signal.

The above and other objects and features of the present invention will become apparent from the following detailed description and the appended claims with reference to the accompanying drawings.

BRIEF DESCRIPTION OF THE DRAWINGS

FIG. 6 is a schematic diagram for explaining a BPF according to the embodiment of the invention;

FIG. 8 is a schematic diagram for explaining the LPF according to the embodiment of the invention;

FIGS. 9A to 9F are waveform diagrams for explaining a holding circuit according to the embodiment of the invention;

FIG. 10A is a block diagram showing an example of the holding circuit according to the embodiment of the invention;

FIG. 10B is a waveform diagram for explaining a detection of a maximal value;

FIGS. 17A and 17B are waveform diagrams for explaining the non-linear circuit according to the embodiment of the invention; and FIGS. 18A and 18B are waveform diagrams for explaining the non-linear circuit according to the embodiment of the invention.

DETAILED DESCRIPTION OF THE PREFERRED EMBODIMENTS

Figure 1:
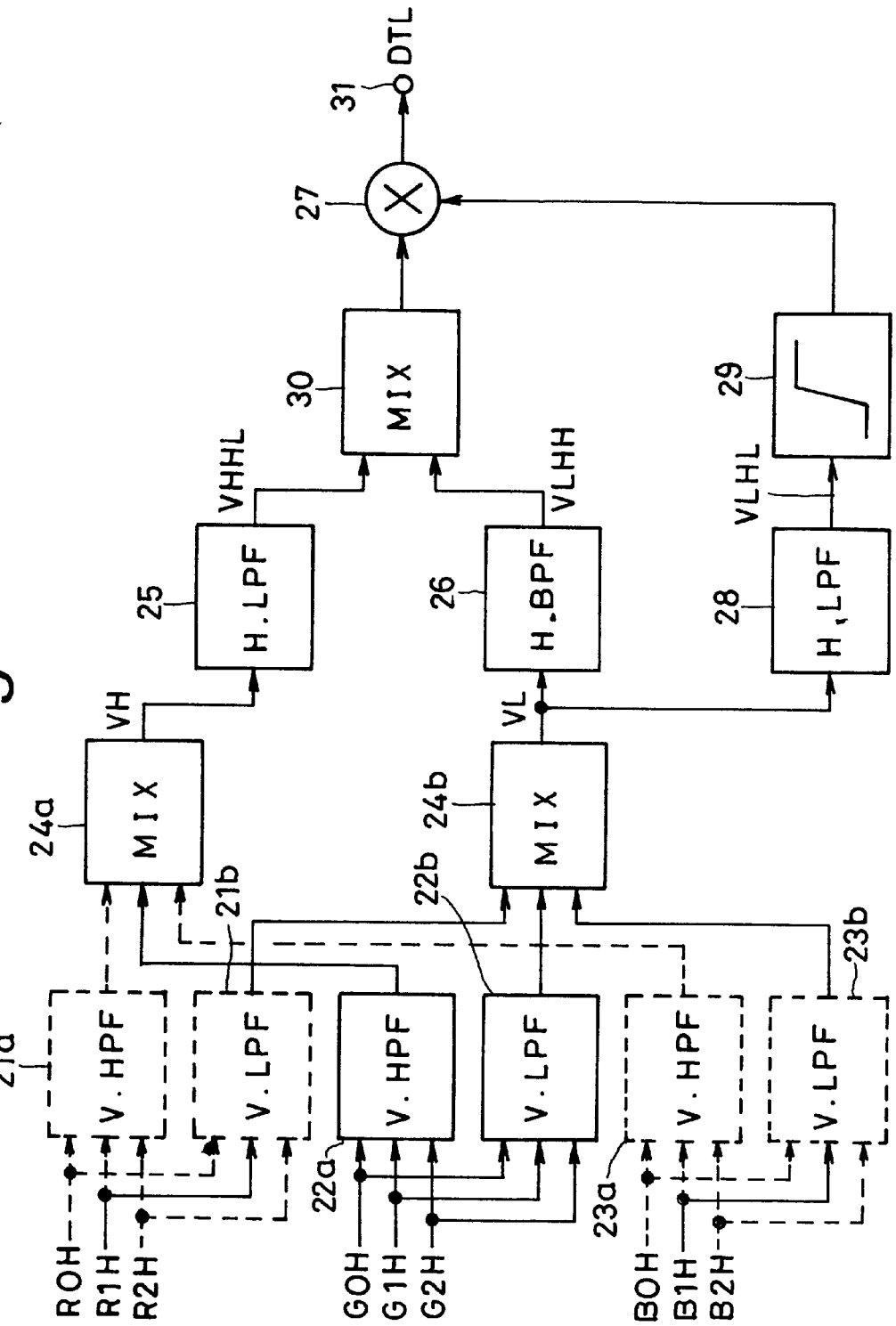
FIG. 1 is a block diagram showing an example of a circuit construction of a conventional image enhancing apparatus.
Figure 2:
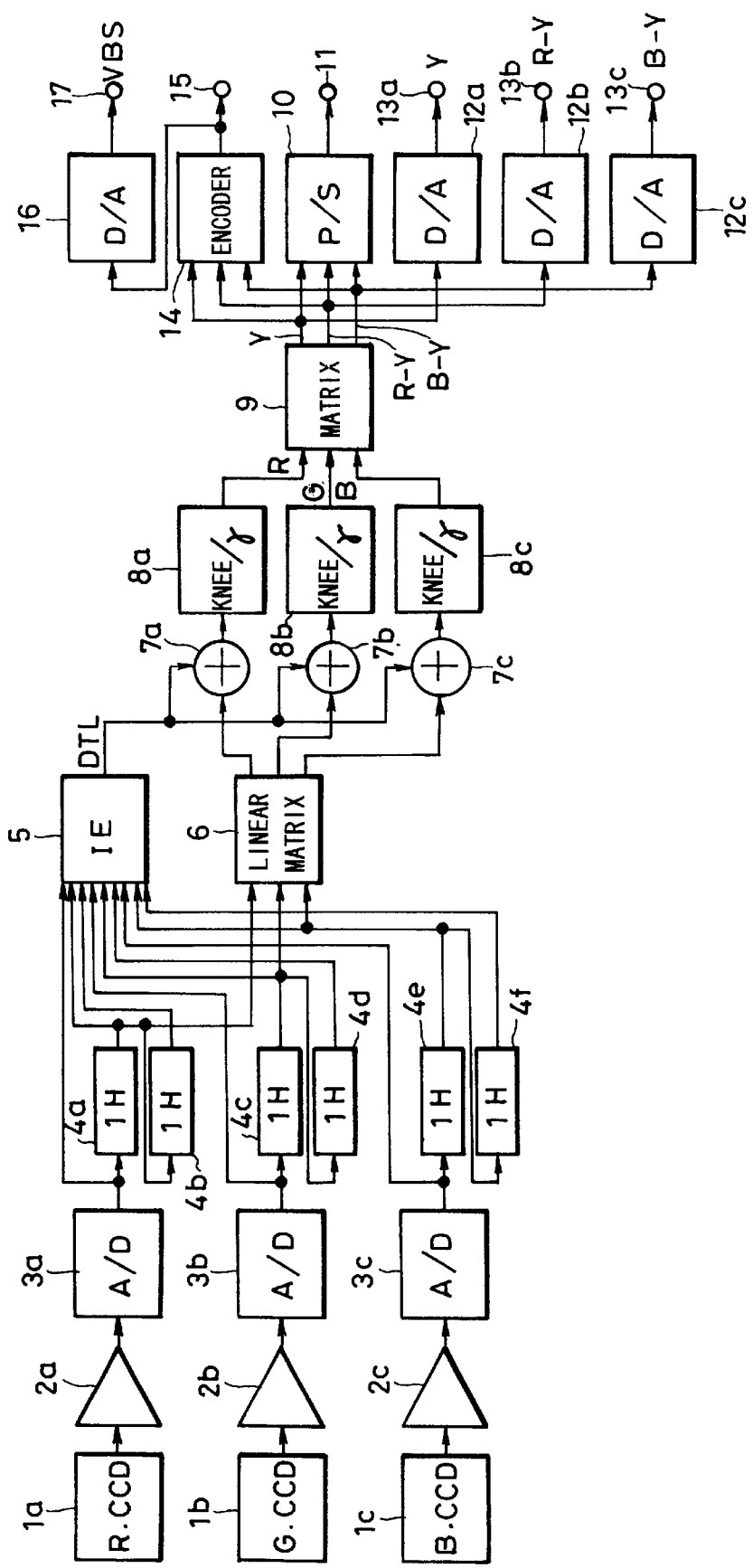
FIG. 2 is a block diagram showing a circuit construction of an example of a video camera to which the invention can be applied.

An embodiment of the present invention will now be described hereinbelow. FIG. 2 shows a circuit construction of a DSP (Digital Signal Processing) camera to which the invention can be applied, namely, a video camera for executing a digital signal process. In FIG. 2, reference numerals 1a, 1b, and 1c denote CCDs as R, G, and B image pickup devices. Output signals of the CCDs 1a, 1b, and 1c are respectively supplied to video amplifiers 2a, 2b, and 2c and are amplified to predetermined levels by the video amplifiers 2a, 2b, and 2c, thereby obtaining a white/black balance. Output signals of the video amplifiers 2a, 2b, and 2c are supplied to A/D converters 3a, 3b, and 3c and are converted into digital signals, respectively. Chrominance signals as such digital signals are supplied to line memories 4a, 4c, and 4e each having a delay amount of 1H (one horizontal interval) and are supplied to an image enhancing apparatus 5.

The signals which were delayed by a time of 1H by the line memories 4a, 4c, and 4e are supplied to the image enhancing apparatus 5 and are also supplied to the image enhancing apparatus 5 through line memories 4b, 4d, and 4f, respectively. 2H delay outputs of image pickup signals of R, G, and B are derived from the line memories 4b, 4d, and 4f. The image enhancing apparatus 5 forms the detail signal DTL as high frequency components in the horizontal and vertical directions for an outline emphasis. The invention mainly relates to a circuit construction of the image enhancing apparatus 5. The 1H delay outputs of the R, G, and B signals of the line memories 4a, 4c, and 4e are supplied to a linear matrix circuit 6 and a hue and a saturation are adjusted.

The detail signal from the image enhancing apparatus 5 is added to output signals corresponding to color components of three primary colors from the linear matrix circuit 6 by adders 7a, 7b, and 7c, respectively. Non-linear processes are executed in knee/gamma correcting circuits 8a, 8b, and 8c. "Knee" denotes a process for compressing the level of a high luminance portion and magnifying an apparent dynamic range. "Gamma" denotes a process to provide characteristics opposite to voltage-luminance characteristics of a CRT. The chrominance signals which were non-linearly processed by the knee/gamma correcting circuits 8a, 8b, and 8c are supplied to a matrix circuit 9. The three primary color signals are converted into a luminance signal of Y and color difference signals R-Y and B-Y by the matrix circuit 9.

The luminance signal Y and the color difference signals R-Y and B-Y from the matrix circuit 9 are converted from the parallel data to the serial data by a parallel/serial converter 10. A digital serial component output signal is taken out from an output terminal 11. The luminance signal and the color difference signals from the matrix circuit 9 are converted into analog signals by D/A converters 12a, 12b, and 12c and are outputted as analog component signals. Namely, the Y signal is taken out from an output terminal 13a, the R-Y signal is taken out from an output terminal 13b, and the B-Y signal is taken out from an output terminal 13c, respectively.

Further, the luminance signal and the color difference signals from the matrix circuit 9 are converted into a digital composite signal by an encoder 14. The digital composite output signal is taken out from an output terminal 15. The digital composite output from the encoder 14 is converted into an analog signal by a D/A converter 16. An analog VBS (Video Burst Sync) output signal is taken out from an output terminal 17.

Figure 3:
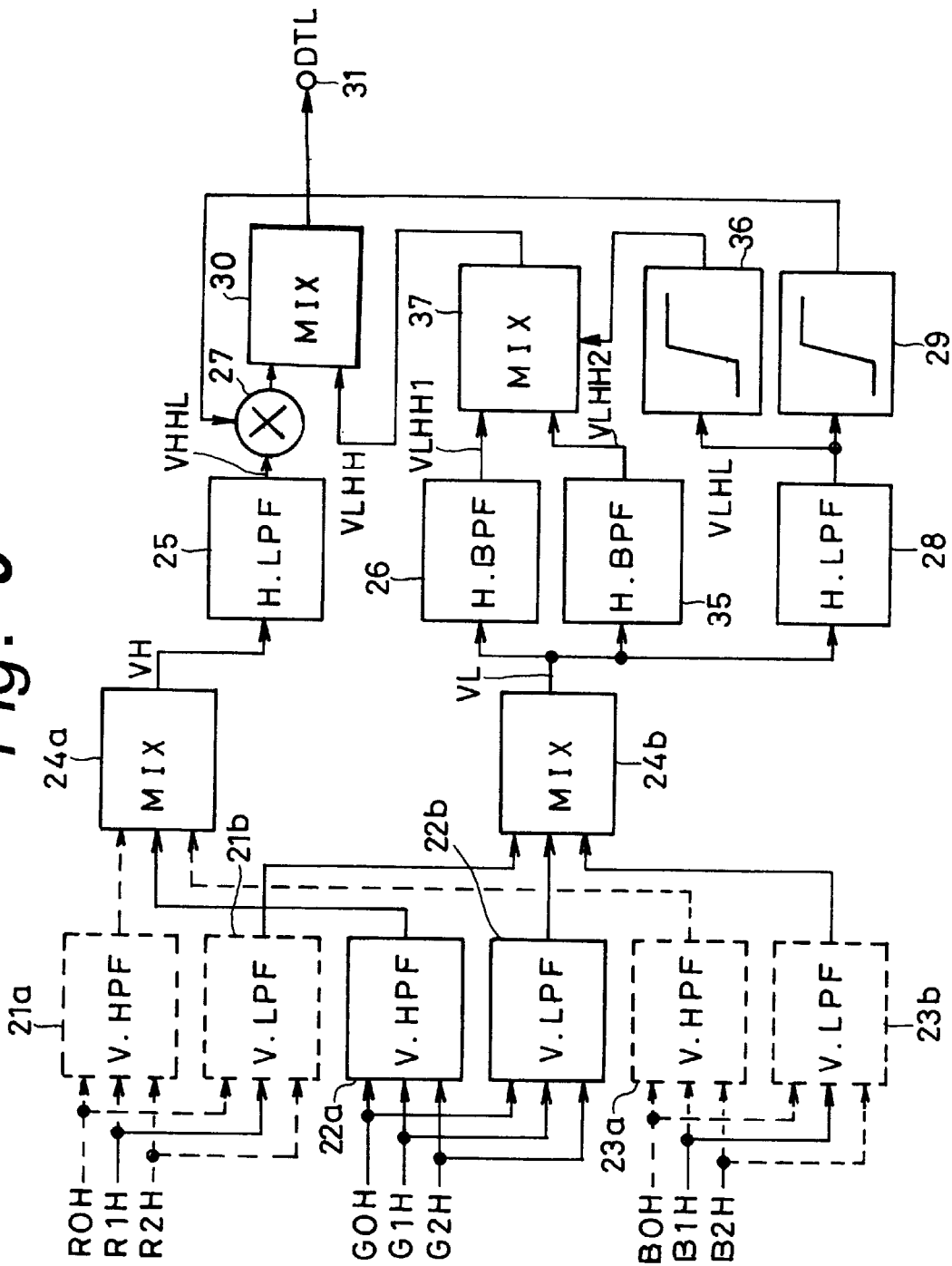
FIG. 3 is a block diagram showing a circuit construction of an image enhancing apparatus according to an embodiment of the invention.

FIG. 3 shows a block diagram of an image enhancing apparatus according to the embodiment of the invention. The image enhancing apparatus of the embodiment corresponds to the image enhancing apparatus 5 in FIG. 2. In FIG. 3, 0H (this means that a delay amount is equal to 0), 1H, and 2H delay outputs of the red signal R are supplied to the HPF (high pass filter) 21a and LPF (low pass filter) 21b in the vertical direction, respectively. 0H, 1H, and 2H delay outputs of the green signal G are supplied to the HPF 22a and LPF 22b in the vertical direction, respectively. 0H, 1H, and 2H delay outputs of the blue signal B are supplied to the HPF 23a and LPF 23b in the vertical direction, respectively.

The HPFs 21a, 22a, and 23a form high frequency signals in the vertical direction of the chrominance signals. The output signals of the HPFs 21a, 22a, and 23a are mixed by the mixer 24a at a predetermined ratio. The vertical high band signal VH from the mixer 24a is transmitted through the LPF 25 in the horizontal direction, so that the vertical high band * horizontal low band signal VHHL is formed and is supplied to the mixer 30 through the multiplier 27.

The LPFs 21b, 22b, and 23b in the vertical direction form low frequency signals in the vertical direction of the chrominance signals. Output signals of the LPFs 21b, 22b, and 23b are mixed by the mixer 24b at a predetermined ratio. The vertical low band signal VL from the mixer 24b is supplied to the BPF (band pass filter) 26 in the horizontal direction, a BPF 35 in the horizontal direction, and the LPF 28 in the horizontal direction. A vertical low band•horizontal high band signal VLHH1 is formed by the BPF 26. A vertical low band•horizontal high band signal VLHH2 is formed by the BPF 35.

Since the 1H delay line has a large circuit scale and is expensive, it is also possible to use the 1H delay line for only the G channel or for only the G and R channels and to form the vertical high band•horizontal low band signal VHHL and the vertical low band•horizontal high band signal VLHH. In such a case, the LPF in the vertical direction is not provided for a channel without the 1H delay line but those signals are directly supplied to the mixers 24a and 24b for detail in the horizontal direction. In FIG. 3, the blocks 21a, 21b, 23a, and 23b surrounded by broken lines show the circuit blocks which can be omitted in case of using only the G channel.

In FIG. 3, the BPF 26 in the horizontal direction is a variable coefficient filter and its center frequency can be varied by a manual adjustment within a range from 2 to 9 MHz in accordance with a taste of the user or a feature of a picture photographed. The output signal VLHH1 of the BPF 26 is supplied to a mixer 37 and is mixed to the output signal VLHH2 of the BPF 35. The output signal VLHH of the mixer 37 and the output signal of the multiplier 27 are supplied to the mixer 30 and the detail signal DTL for an outline emphasis is taken out from the output terminal 31 of the mixer 30.

The output signal (DC components) VLHL of the LPF 28 in the horizontal direction is supplied to the non-linear circuit 29 and a non-linear circuit 36. A mixture ratio of the mixer 30 is controlled by an output of the non-linear circuit 29. A mixture ratio of the mixer 37 is controlled by an output of the non-linear circuit 36.

A center frequency of the BPF 35 is set to be lower than that of the BPF 26 (by about 2 MHz). Each of the non-linear circuits 29 and 36 has, for example, a comparator, has non-linear input-output characteristics, and executes a non-linear process (process of the "level dependent") in a manner such that the output signal is set to 0 near the black level of the input signal and to 1 at a level that is equal to or higher than a predetermined level.

The vertical low band * horizontal high band signal VLHH from the mixer 37 is a component in the horizontal direction of the detail signal DTL. Therefore, as the center frequency of the BPF 26 is deviated to the high frequency side, a fine outline emphasis is executed. However, it is largely influenced by noises. In the image enhancing apparatus shown in FIG. 3, therefore, the center frequency of the other BPF 35 in the horizontal direction is suppressed to a low frequency (about 2 MHz) and a component in the horizontal direction of the detail signal is formed without making the noises conspicuous. On the other hand, the signal VHHL serving as a component in the vertical direction of the detail signal is not so largely influenced by the noises because the LPF 25 in the horizontal direction is provided.

The vertical low band•horizontal low band signal (DC components) VLHL is supplied to the non-linear circuit 36. The mixer 37 is controlled by an output of the non-linear circuit 36. A mixture ratio of the output signal VLHH1 of the BPF 26 in the horizontal direction and the output signal VLHH2 of the BPF 35 is varied. When the mixture ratio is now expressed by α, the output VLHH of the mixer 37 is expressed by $$VLHH = (1-\alpha) \cdot VLHH1 + \alpha VLHH2$$

By controlling the mixture ratio α, a boost frequency of the vertical low band•horizontal high band signal VLHH can be controlled.

In case of controlling the mixture ratio α, since the output signal is close to the black level, it is largely influenced by the noises. Therefore, the mixture ratio α is increased at a point near the black level, thereby increasing a ratio at which the output of the BPF 35 is mixed. Namely, the boost frequency is reduced. Thus, the outline is made fat. However, the details can be also added to a point near the black level without increasing the noises. The embodiment of the invention has an advantage in which since an effect similar to a phenomenon such that the frequency characteristics deteriorate in a portion where the gain near the black level in the analog signal process is high is derived, so that the user hardly feels a sense of disorder.

Figure 4:
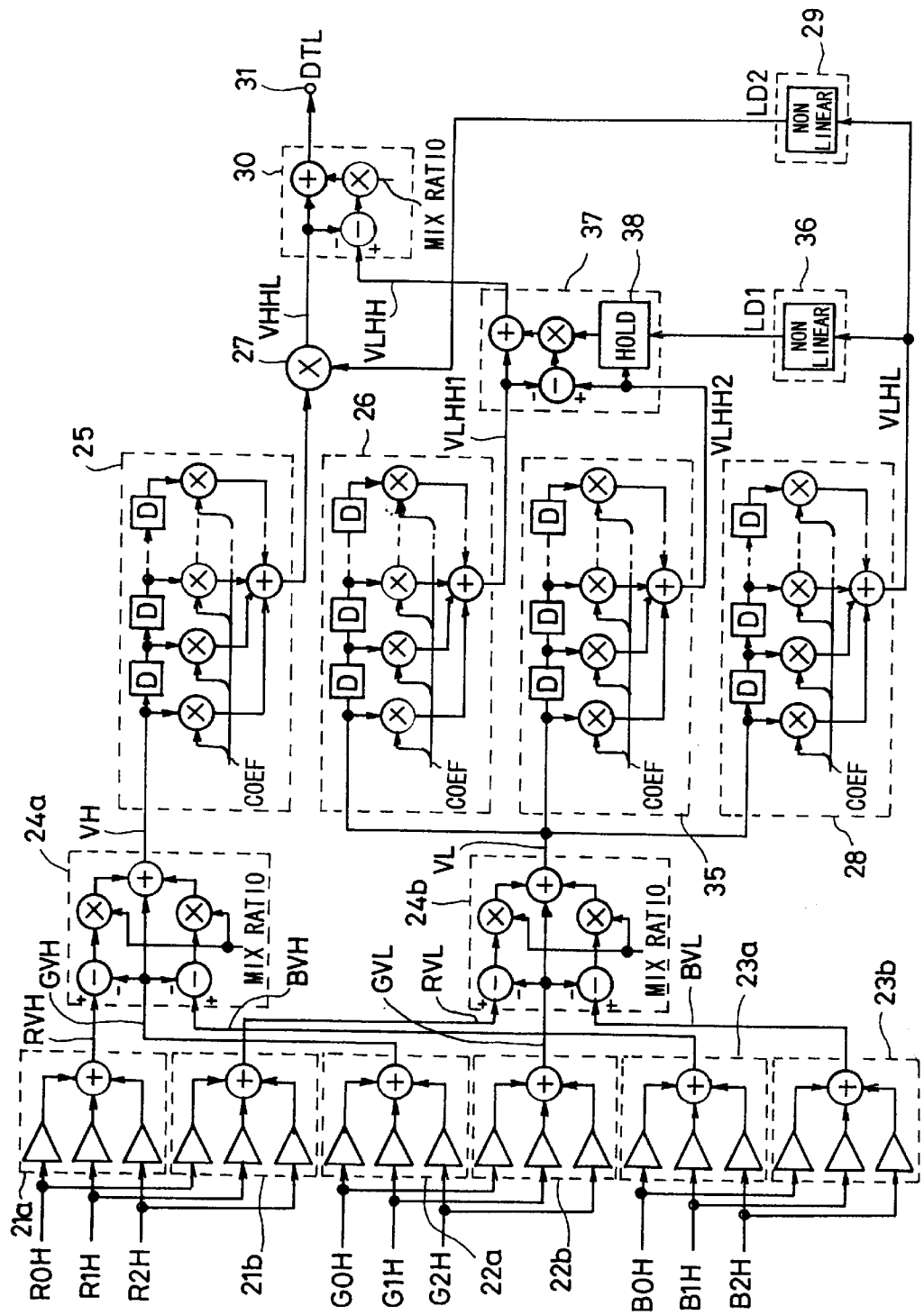
FIG. 4 is a block diagram showing a further detailed circuit construction of the image enhancing apparatus according to the embodiment of the invention.

FIG. 4 shows a more detailed circuit construction of the image enhancing apparatus (FIG. 3) according to the embodiment of the invention. In FIG. 4, delay outputs (R0H, G0H, B0H), (R1H, G1H, B1H), and (R2H, G2H, B2H) of the three primary color signals R, G, and B are respectively supplied to the HPFs 21a, 22a, and 23a in the vertical direction and the high frequency components in the vertical direction are extracted. Since an increase in number of 1H delay circuits results in an increase in circuit scale and costs, the degree number in the vertical direction cannot be increased. Therefore, each of the HPFs 21a, 22a, and 23a is constructed by a fixed coefficient filter of three taps (for example, coefficients are set to $-\frac{1}{2}$, 1, $-\frac{1}{2}$) and a zero point exists in a direct current.

The delay outputs (R0H, G0H, B0H), (R1H, G1H, B1H), and (R2H, G2H, B2H) of the three primary color signals R, G, and B are supplied to the LPFs 21b, 22b, and 23b in the vertical direction and the low frequency components in the vertical direction are taken out. As mentioned above, since the degree number in the vertical direction cannot be set to a high degree, each of the LPFs 21b, 22b, and 23b is constructed by a fixed coefficient filter of three taps (for example, coefficients are set to $\frac{1}{4}$, $\frac{1}{2}$, $\frac{1}{4}$). Further, a zero point exists at a point of $\frac{1}{2}$ of a sampling frequency in the vertical direction. When the 1H delay circuits of red and blue are not used, the LPFs 21b, 22b, and 23b are not provided for the channels without the 1H delay circuit but the signals are directly supplied to the mixers 24a and 24b.

Figure 5:
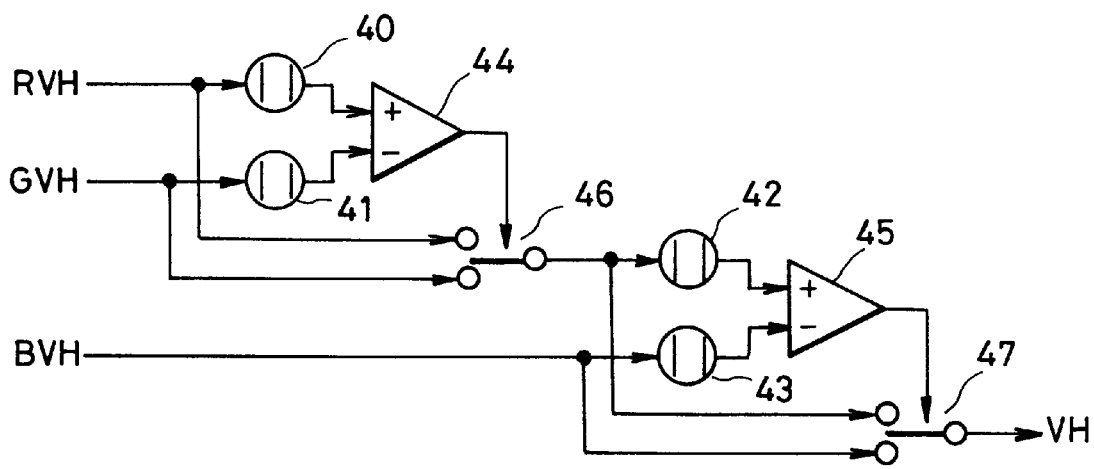
FIG. 5 is a block diagram showing an example of a mixer according to the embodiment of the invention.

An output RVH of the HPF 21a, an output GVH of the HPF 22a, and an output BVH of the HPF 23a are supplied to the mixer 24a. Since a gain of the mixer 24a is equal to 1, the sum of the coefficients is equal to 1 and it is sufficient to use two multipliers in the mixer 24a. Although the mixture ratio is manually adjusted in accordance with a feature of a taste of the user or a feature of an image photographed, the S/N ratio generally deteriorates in accordance with the order of R, G, and B. Therefore, ordinarily, the mixture ratio of the signal G of green is set to a slightly large value and that of the signal B of blue is set to a slightly small value. Since the mixer 24a mixes the AC components, as shown in FIG. 5, a construction comprising absolute value forming circuits 40, 41, 42, and 43, comparators 44 and 45, and switches 46 and 47 can be used in place of the construction of FIG. 4. However, in case of the mixer 24b in which the signals to be mixed also contain DC components, the construction of FIG. 5 cannot be used.

In FIG. 5, the signal RVH is supplied to the absolute value forming circuit 40 and the absolute value signal (signal in which the absolute value was formed) is supplied to the comparator 44. The signal GVH is supplied to the absolute value forming circuit 41 and the absolute value signal is supplied to the comparator 44. The comparator 44 compares amplitudes of the absolute values of the signals RVH and GVH. Either one of the signals having the larger amplitude of the absolute value is selected by the switch 46. The signal selected by the switch 46 is supplied to the absolute value forming circuit 42 and the absolute value signal is supplied to the comparator 45. The signal BVH is supplied to the absolute value forming circuit 43 and the absolute value signal is supplied to the comparator 45. The comparator 45 compares the amplitudes of the absolute values of the signal selected by the switch 46 and the signal BVH. Either one of the signals having the larger amplitude of the absolute value is selected by the switch 47 and the signal of the larger amplitude of the absolute value is generated.

Explaining with reference to FIG. 4 again, an output RVL of the LPF 21b, an output GVL of the LPF 22b, and an output BVL of the LPF 23b are supplied to the mixer 24b. Since the gain of the mixer 24b is equal to 1, the sum of the coefficients is equal to 1 and it is sufficient to use only two multipliers in the mixer 24b. Although the mixture ratio is varied in accordance with a taste of the user and a feature of the image photographed, the S/N ratios generally deteriorate in accordance with the order of G, R, and B. Therefore, ordinarily, a mixture ratio of the signal G of green is set to a slightly large value and that of the signal B of blue is set to a slightly small value.

The LPF 25 band-limits the high band component VH in the vertical direction to the horizontal direction. The high band component in the horizontal direction denotes the high band component in the oblique direction because the high band component VH in the vertical direction is inputted. Ordinarily, since in many cases, even if a resolution in the oblique direction is dropped, an image is not so conspicuous. Therefore, the band limitation is executed in order to obtain a high S/N ratio. However, in case of the NTSC system, 3.58 MHz becomes a frequency of a subcarrier in the horizontal direction and in order to prevent an increase in cross color by the outline emphasis, an attenuation amount around the cross color is increased. In case of the PAL system, a point of the frequency of $\frac{1}{2}$ becomes a frequency of the subcarrier in the vertical direction. Further, since there is also an offset of 25 Hz, there is no effect of the prevention of the cross-color. Therefore, the signal is limited to a proper band by the S/N ratio and the resolution in the oblique direction.

As an example of the LPF 25, when the sampling frequency is set to 36 MHz of the NTSC system, an attenuation level at a frequency near 3.58 MHz is set to −40 dB and an attenuation level at a frequency of 4 MHz or higher is set to −20 dB. The LPF 25 has 15 taps and coefficients are set to (8, 5, 5, 8, 8, 12, 11, 14, 11, 12, 8, 8, 5, 5, 8)/128.

The BPF 26 extracts high band components in the horizontal direction from low band components in the vertical direction and takes out the vertical low band * horizontal high band signal VLHH1 as a detail component in the horizontal direction. The center frequency (boost frequency) in the frequency characteristics of the BPF 26 is varied in accordance with a taste of the user and a feature of an image photographed. FIG. 6 shows an example of the coefficients when the sampling frequency is equal to 36 MHz. As shown in FIG. 6, the BPF 26 has 21 taps. By manually adjusting the center frequency within a range from 2 to 9 MHz, the setting of the coefficients can be switched. A thick/thin waveform width of an impulse response occurs on a time base due to a difference of the center frequency.

The BPF 35 extracts the high band component in the horizontal direction from the low band component in the vertical direction, thereby taking out the vertical low band•horizontal high band signal VLHH2 as a detail component in the horizontal direction. It is desired to set the boost frequency to an enough low frequency so as not to be influenced by the noises as possible. However, when the set frequency of the BPF 26 is too high, the difference is too large, so that a sense of disorder occurs. It is, therefore, practical to set the frequency of the BPF 35 to about $\frac{1}{2}$ of the set frequency of the BPF 26. If the set frequency is set to be too low, it is excessively far from the outline emphasis function. Therefore, it is desirable not to set the frequency to 2 MHz or less.

Figure 7:
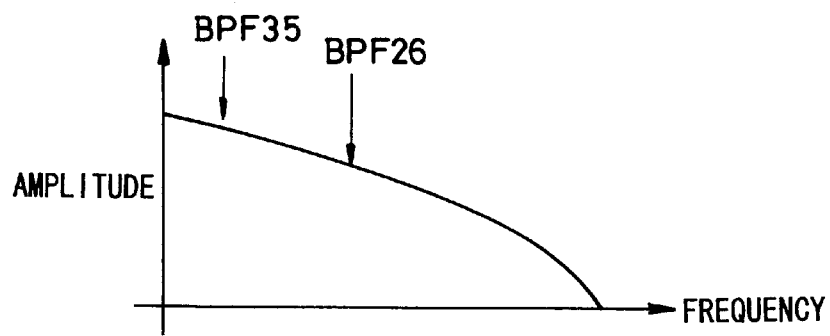
FIG. 7 is a schematic diagram for explaining the BPF according to the embodiment of the invention.

Fundamentally, the coefficients of the BPF 35 can be set in a manner similar to those of the BPF 26. However, ordinarily, as shown in FIG. 7, as the frequency approaches the high frequency, the amplitude of the input signal drops due to characteristics of the lens, optical LPF, CCD, pre-filter of the A/D converter, and the like. Since the frequency characteristics of the input signal are not flat as mentioned above, it is necessary to change the gain as compared with that of the BPF 26. For this purpose, although the gain at the boost frequency is generally matched, it can be also varied in accordance with the feature of the image photographed.

The LPF 28 further performs a band limitation in the horizontal direction for the low band component VL in the vertical direction. Since the band limited signal VLHL is used for a "level dependent" control, the LPF 28 generates the signal (DC components) VLHL which is limited to the band and is not extracted as a detail signal. Therefore, the band limitation is executed so as to set to a frequency lower than the frequency boosted by the BPF 35. FIG. 8 shows an example of filter coefficients in the case where the sampling frequency is equal to 36 MHz and cut-off frequencies are set to 1 MHz, 2 MHz, and 3 MHz, respectively. In FIG. 8, in case of 1 MHz, there are 21 taps. In case of 2 MHz, there are 17 taps. In case of 3 MHz, there are 11 taps.

The mixer 37 mixes the detail signals VLHH1 and VLHH2 in the horizontal direction from the BPFs 26 and 35. The boost frequency is varied by mixing those detail signals and changing the mixture ratio. The gain of the mixer 37 is equal to 1 and the sum of the coefficients is equal to 1. Therefore, it is sufficient to set the number of multipliers in the mixer 37 to one. A holding circuit 38 is connected between the multiplier and an output of the non-linear processing circuit 36 for "level dependent". FIGS. 9A to 9F show a waveform for explaining the holding circuit 38.

In FIGS. 9A to 9F, FIG. 9A shows an example (step waveform) of a waveform of the input signal VL which is inputted from the mixer 24b to the BPF 26, BPF 35, and LPF 28. For such an input waveform, the output signal VLHH1 from the BPF 26 is as shown in FIG. 9B and the output signal VLHH2 from the BPF 35 is as shown in FIG. 9C.

A signal of a waveform shown in FIG. 9D is generated from the LPF 28 and a mixture ratio control signal LD1 shown in FIG. 9E is generated from the non-linear circuit 36. When the mixture ratio output LD1 is directly supplied as coefficients (mixture ratio) in the mixer 37, the output VLHH of a discontinuous waveform as shown in FIG. 9F is generated. To prevent it, the holding circuit 38 to hold the mixture ratio control signal LD1 to a constant value is provided for. an interval corresponding to one pulse of the detail signal. FIG. 10A shows an example of a circuit construction to realize the holding circuit 38.

As shown in FIG. 10A, the holding circuit 38 has: a shift register comprising a plurality of registers 51a to 51g; a shift register comprising a plurality of registers 53a to 53f; and a shift register comprising a plurality of registers 54a to 54d. Each of the shift registers has a delay amount of one pixel (one sample). Switching circuits 58a to 58g are provided on the input side of delay elements other than a delay element 51d for the shift register comprising the registers 51a to 51g. The mixture ratio LD1 (input signal) or an output signal of the delay element at the front stage is supplied to one input terminal of each of the switching circuits 58a to 58g and an output signal of the delay element 51c is supplied to the other input terminals. The switching circuits 58a to 58g are connected to the lower side in the ordinary state and execute the shifting operation.

The switching circuits 58a to 58g are controlled by outputs of AND gates 52a to 52g. The signal VLHH2 from the BPF 35 having a lower boost frequency is supplied to the shift register comprising the registers 53a to 53f and to an absolute value forming circuit 55. The signal VLHH2 is converted into parallel signals by the shift register and supplied to one input of each of exclusive OR gates. An output of the register 53c is commonly supplied to the other inputs of the exclusive OR gates. An output of the exclusive OR gate is inverted and when logic values of two inputs are equal, the exclusive OR gate generates an output signal at the high level.

The absolute value of the signal VLHH2 from the absolute value forming circuit 55 is supplied to the shift register comprising the registers 54a to 54d. The center pixel among three continuous pixels extracted by the shift register and the pixels before and after the center pixel are supplied to subtractors 56a and 56b. Therefore, differences between the center pixel among the three continuous pixels and the pixels before and after the center pixel are formed by the subtractors 56a and 56b, respectively.

Output signals of the subtractors 56a and 56b are supplied to comparators 57a and 57b and are compared with threshold values, respectively. Output signals of the comparators 57a and 57b are supplied to an AND gate 57c. As shown in FIG. 10B, when both of the two differences are larger than a predetermined magnitude (threshold value) due to the comparators 57a and 57b and AND gate 57c, it is detected that the output is maximal. An output of the AND gate 57c is set to the high level. The above threshold value has been held in an internal register and is supplied from an external control apparatus to the comparators 57a and 57b through a control bus.

The output (vertical low band•horizontal high band signal VLHH2) of the BPF 35 as a thick horizontal detail component is supplied to the absolute value forming circuit 55. Further, only the sign is supplied to the shift register (53a to 53f). An output signal of the absolute value forming circuit 55 is supplied to the shift register (54a to 54d). When it is detected by the comparators 57a and 57b and AND gate 57c that the output of the register 54c of the shift register (54a to 54d) has a maximal value, since the sign of the signal VLHH2 at the maximal point has been generated in the output of the register 53c, the outputs of the registers 53a to 53f as a sign of the signal VLHH2 of each pixel around the maximal point and the output of the register 53c are compared by the exclusive OR gates and the AND gates 52a to 52g.

When it is detected by the exclusive OR gate and the AND gates 52a to 52g that the maximal value of the signal VLHH2 and the sign coincide, the switching circuits 58a to 58g are connected to the upper side in FIG. 10A. Thus, the value of the mixture ratio LD1 at the maximal point of the signal VLLH2 is supplied to the registers 51a, 51b, 51c, 51e, . . . , and 51g and all of the contents of the registers are controlled to the same value.

Figures 11A, 11B:
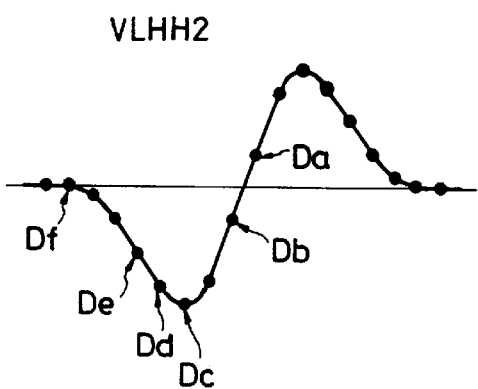
FIG. 11A is a waveform diagram for explaining the operation of an example of the holding circuit according to the embodiment of the invention.
FIG. 11B is a timing chart.

FIGS. 11A and 11B show the operation of the foregoing holding circuit 38. A timing chart when the signal VLHH2 as shown in FIG. 11A is shown in FIG. 11B. Namely, a time change of the contents of the registers 51a to 51g are shown on the top side in FIG. 11B. Time changes of outputs of the AND gates 52a to 52g are shown under them. Further, the time changes of the contents (signs) of the registers 53a to 53f are shown and the time changes of the contents (absolute values of the registers 54a to 54d are shown. Moreover, outputs of the subtractors 56a and 56b and outputs of the switching circuits 58a to 58g are shown.

As mentioned above, the value of the mixture ratio LD1 at the maximal point is held by the holding circuit 38 shown in FIG. 10A for an interval of the pulse width of the signal VLHH2, so that the value of the mixture ratio of the mixer 37 is also held.

As widths of areas on both sides of the maximal point to hold the mixture ratio, the same portion where the polarity of the detail signal is the same as that of the maximal point is searched within a range of about one impulse response of the BPF 35 to generate the signal VLHH2 and is regarded as a range of the waveform of the pulse. The impulse response of the signal VLHH1 from the BPF 26 is included in the impulse response of the signal VLHH2. When the input is a thin impulse, there is a case where the polarities of the responses of the BPF 26 and BPF 35 are opposite. However, there is no problem since the response of the LPF 28 for "level dependent" is almost equal to 0.

Figure 12:
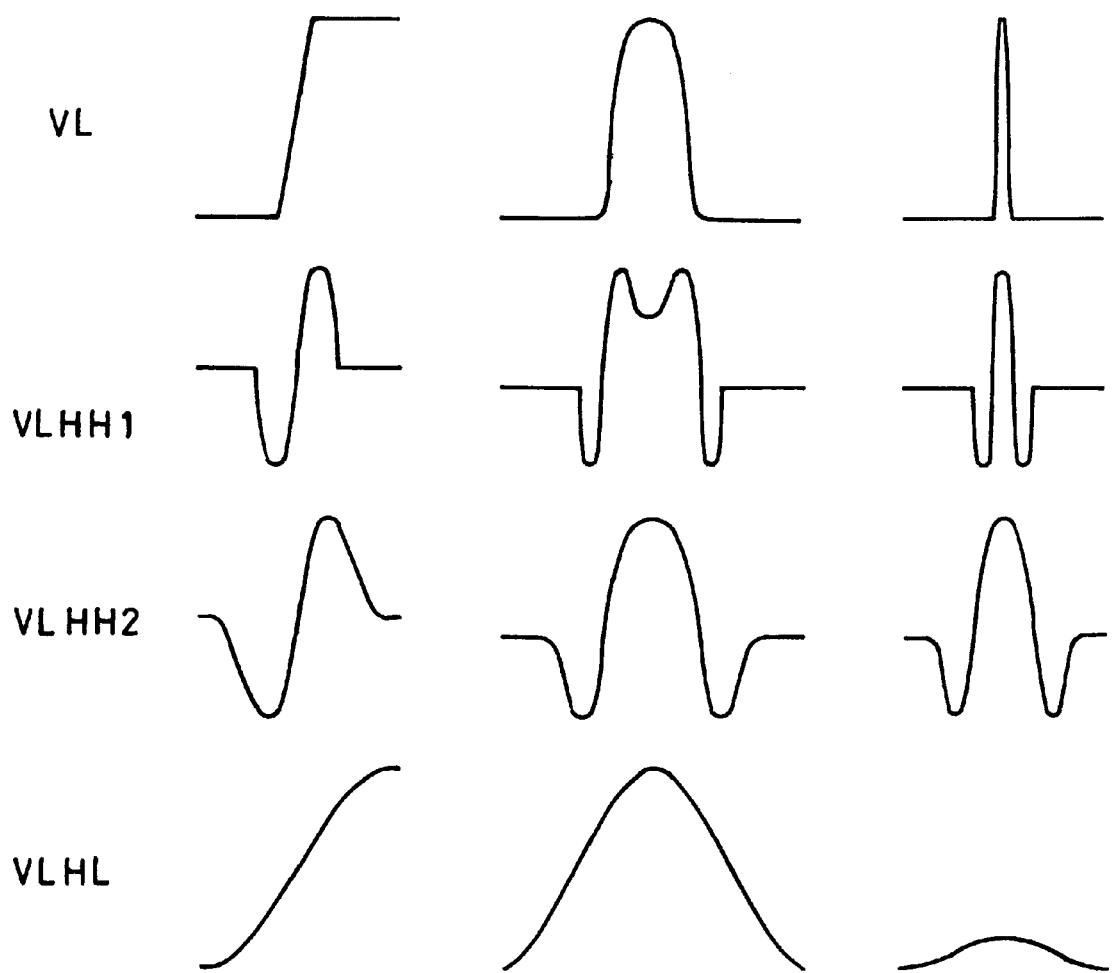
FIG. 12 is a waveform diagram for explaining a mixer according to the embodiment of the invention.

When the low band signal VL in the vertical direction from the mixer 24b as shown in FIG. 12 has a step waveform or when the signal VL is a thick pulse, the waveform of the signal VLHH1 enters the inside of the waveform of the signal VLHH2. When the output VL from the mixer 24b is a thin pulse, there is also a case where the signal VLHH1 doesn't enter the inside of the waveform of the signal VLHH2. However, since the output VLHL (DC components) is almost equal to 0, the mixture ratio hardly changes and no problem occurs.

The non-linear circuit 36 is a circuit for generating the mixture ratio LD1 between the signals VLHH1 and VLHH2 as a detail signal in the horizontal direction and generates the mixture ratio LD1 by calculating from the horizontal low band•vertical low band signal VLHL which doesn't include a detail. As a general circuit, the non-linear circuit 36 is constructed by a lookup table using an RAM. The non-linear circuit 36 is connected to a bus for a control and a table is loaded from the external control apparatus. As an example of a table, a table in which an inclination of input/output characteristics of a gamma correcting circuit as shown in FIG. 13A has been optimally normalized (FIG. 13B) can be used.

Figure 13A:
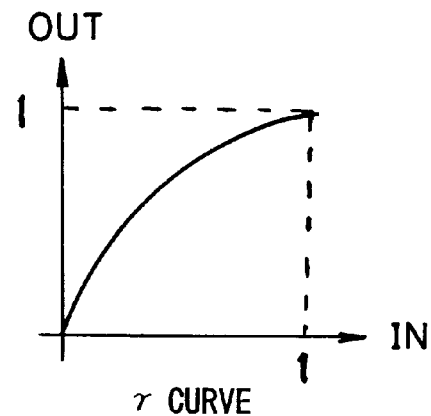
FIGS. 13A and 13B are waveform diagrams for explaining a non-linear circuit according to the embodiment of the invention.

In FIG. 13A, now assuming that a function of the gamma correcting circuit is set to g, an output is obtained by an equation y=g(x). Now, assuming that a differentiation of (g) is set to g', a normalization can be executed by LD1[g'(VLHL)−1/[g'(0)−1]

Figure 13B:
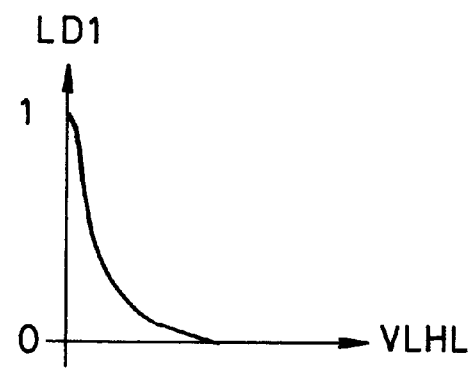

FIG. 13B shows characteristics of the mixture ratio LD1 normalized as mentioned above. However, it is limited to 0≦LD1≦1. Now, assuming that a corresponds to the mixture ratio LD1, the output VLHH of the mixer 37 is expressed by (VLHH=(1−α)•VLHH1+α•VLHH2]

as mentioned above. Therefore, as the mixture ratio LD1 from the non-linear circuit 36 is large, a ratio of the signal VLHH2 which occupies in the output increases.

Figure 14:
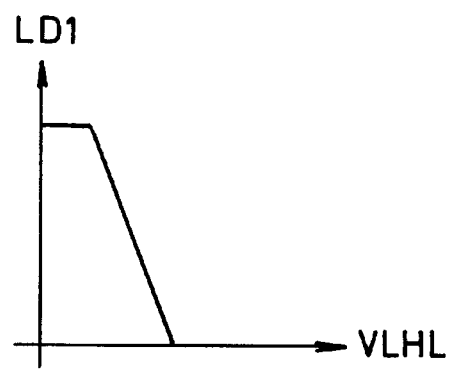
FIG. 14 is a waveform diagram for explaining a non-linear circuit according to the embodiment of the invention.

When a scale of the circuit constructed by using the RAM is too large, a construction using a comparator is used as a non-linear circuit 36. In this case, the non-linear circuit 36 has characteristics of a polygonal line as shown in FIG. 14. In the characteristics, since the characteristics become discontinuous at a point near the change point, it is preferable to set a width of transition region where the mixture ratio LD1 changes to a wide width as much as possible.

Figure 15:
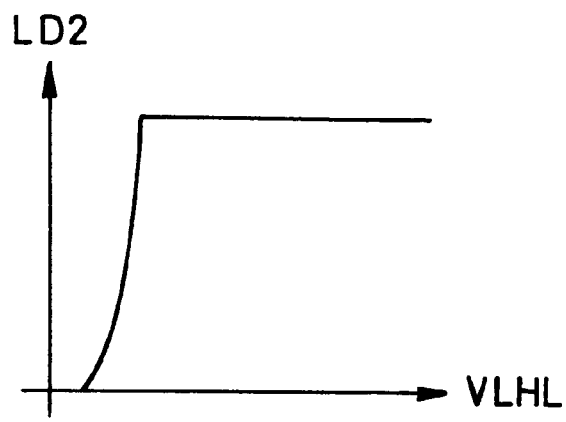
FIG. 15 is a waveform diagram for explaining the non-linear circuit according to the embodiment of the invention.

The non-linear circuit 29 is a circuit to decide a gain of the vertical high band * horizontal high band signal VHHL and calculates the gain LD2 from the low band signal VLHL in the horizontal and vertical direction. As a general circuit, a construction of a lookup table using an RAM is used. The non-linear circuit 29 is connected to a bus for a control and the contents in the table are loaded from the external control apparatus. In the analog circuit, although the switching is merely performed at a predetermined level, characteristics when it is turned off are rounded as shown in FIG. 15. Input/output characteristics which are analogous to the change curve of the gain LD2 when using the analog circuit are set so as to write into the table.

Figure 16:
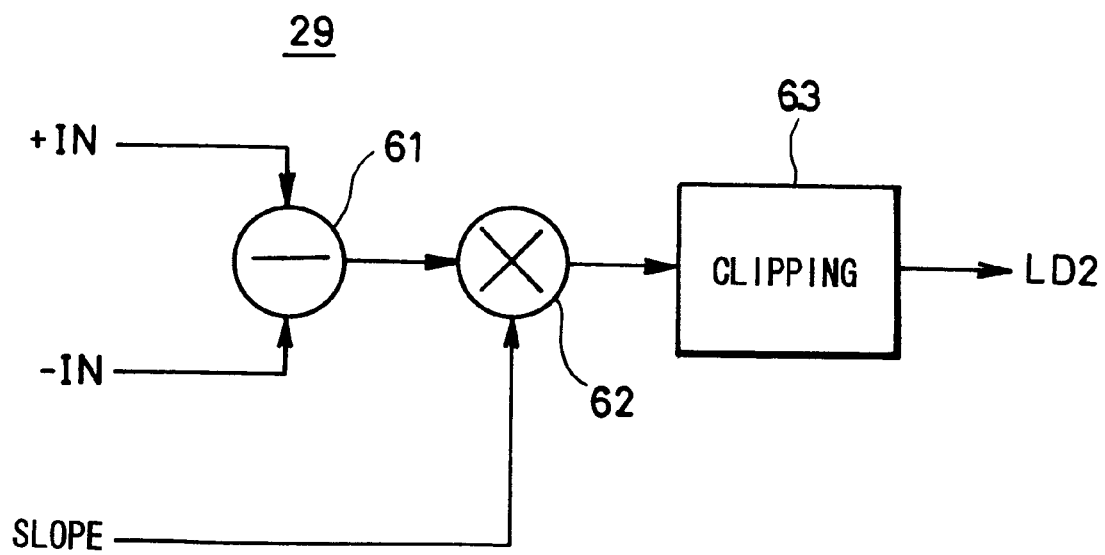
FIG. 16 is a block diagram showing an example of the non-linear circuit according to the embodiment of the invention.

As shown in FIG. 16, as a non-linear circuit 29, it is also possible to use a comparator as constructed by a subtractor 61, a multiplier 62, and a clipping circuit 63. The plus side input of the subtractor 61 is set to +IN and the minus side input is set to −IN. When a coefficient for the multiplier 62 to which an output of the subtractor 61 is supplied is set to be a slope, an output OUT is as shown in FIG. 17A.

In the embodiment, the signal VLHL is supplied as a plus side input of the subtractor 61 and an initial XP of the transition region is supplied as a minus side input. An output of the subtractor 61 is set to (VLHL−XP) and when the signal VLHL is equal to or less than XP, the gain LD2 is equal to 0. When the inclination is given to the multiplier 62 as a slope which is supplied, characteristics as shown in FIG. 17B are obtained. Since the gain LD2 can be set to a value only within a range from 0 to 1, as the inclination is small, the transition region where the gain LD2 changes is widened. When the initial XP of the transition region is set to a fairly large value, the waveform of the detail signal is distorted.

For example, in case of waveforms of an input signal (IE IN), a detail signal DTL' (input of the multiplier 27), and the signal VLHL as shown in FIG. 18A, when the signal VLHL crosses the detail signal DTL' of the level shown by a broken line or less, an output waveform is distorted as shown in FIG. 18B. Therefore, it is preferable that the initial XP of the transition region is not so largely set.

The mixer 30 is a mixer for mixing the detail component (vertical high band•horizontal low band signal) VHHL in the vertical direction and the detail component (vertical low band•horizontal high band signal) VLHH in the horizontal direction. The gain of the mixer 30 is equal to 1 and the sum of the coefficients is equal to 1. Therefore, it is sufficient that the number of multipliers in the mixer 30 is set to one. The detail signal DTL is taken out from the output terminal 31 from the mixer 30.

In the mixers 24a, 24b, and 30 in FIG. 4, the mixture ratio, the coefficients in the variable coefficient filter, and the like are held in registers (not shown) and are set from the external control apparatus through a control bus. The values of the coefficients are varied in accordance with a taste of the user and the feature of the image. When the sampling frequency is changed due to an exchange of a CCD or the like, it is necessary to change the coefficients of the filter even when the frequency characteristics are not changed.

According to the invention, at a level near the black level where the gain in the gamma correcting circuit is high, by shifting the frequency characteristics of the detail signal to the low band, the S/N ratio is improved and the enough amount of detail signal from the white level to the black level can be added. Since the gain of the high frequency at a level near the black-level of a high gain drops in the analog circuit, even in the construction of the digital circuit, by providing an effect similar to that of the analog circuit, the operator can accept without a sense of disorder.

Although the preferred embodiments of the invention have been described above, the invention is not limited to the foregoing embodiments but many modifications and variations are possible within the spirit and scope of the appended claims of the invention.

What is claimed is:

1. A video camera comprising:

image pickup means for imaging an object and generating a video signal;

signal level detecting means for detecting a signal level of DC components of said video signal;

detail signal forming means for forming a detail signal having a frequency to correct an outline of an image which is expressed by said video signal by extracting partial frequency components in said video signal from said video signal;

control means for controlling said detail signal forming means in accordance with an output of said signal level detecting means in a manner such that when the signal level of said DC components is low, the frequency of the detail signal to be formed by said detail signal forming means becomes lower; and mixing means for mixing said detail signal to said video signal.

2. A video camera according to claim 1, wherein said detail signal forming means comprises:

a first filter having a first center frequency for extracting a relatively high first frequency component from said video signal;

a second filter having a second center frequency, said second center frequency being less than said first center frequency, for extracting a relatively low second frequency component from said video signal; and frequency component mixing means for mixing an output of said first filter and an output of said second filter at a mixture ratio which is determined in accordance with a control signal that is supplied from said control means.

3. A video camera comprising:

image pickup means for imaging an object and generating a video signal;

signal level detecting means for detecting a signal level of DC components of said video signal;

detail signal forming means for forming a detail signal to correct an outline of an image which is expressed by said video signal by extracting partial frequency components in said video signal from said video signal;

control means for controlling said detail signal forming means on the basis of an output of said signal level detecting means in a manner such that as a signal level of said DC components is low, the frequency of the detail signal to be formed by said detail signal forming means becomes lower; and mixing means for mixing said detail signal to said video signal;

wherein said detail forming means comprises a first filter for extracting a relatively high first frequency component from said video signal, a second filter for extracting a relatively low second frequency component from said video signal, and frequency component mixing means for mixing an output of said first filter and an output of said second filter at a mixture ratio which is determined on the basis of a control signal that is supplied from said control means; and wherein said frequency component mixing means comprises an extremal value detecting means for detecting a maximal point and a minimal point of the output of said second filter, and mixture ratio holding means for holding the mixture ratio of said frequency component mixing means so as not to change for a predetermined period of time when the maximal point or the minimal point is detected by said extremal value detecting means.

4. A video camera according to claim 1, further comprising non-linear compressing means for non-linearly compressing the signal level of said video signal, and wherein said detail signal forming means forms said detail signal from the video signal which is not compressed by said non-linear compressing means.

5. A video camera according to claim 1, wherein said video signal is a digital video signal and a detail signal of said digital signal is formed by a digital signal process.

6. An image enhancing apparatus of a video signal comprising:

signal level detecting means for detecting a signal level of DC components of a video signal;

detail signal forming means for forming a detail signal having a frequency to correct an outline of an image which is expressed by said video signal by extracting partial frequency components in said video signal from said video signal;

control means for controlling said detail signal forming means in accordance with an output of said signal level detecting means in a manner such that [as a] when the signal level of said DC components is low, the frequency of said detail signal to be formed by said detail signal forming means becomes lower; and mixing means for mixing said detail signal to said video signal.

7. An apparatus according to claim 6, wherein said detail signal forming means comprises:

a first filter having a first center frequency for extracting a relatively high first frequency component from said video signal;

a second filter having a second center frequency, said second center frequency being less than said first center frequency, for extracting a relatively low second frequency component from said video signal; and frequency component mixing means for mixing an output of said first filter and an output of said second filter at a mixture ratio which is determined in accordance with a control signal that is supplied from said control means.

8. An image enhancing apparatus of a video signal comprising:

signal level detecting means for detecting a signal level of DC components of a video signal;

detail signal forming means for forming a detail signal to correct an outline of an image which is expressed by said video signal by extracting partial frequency components in said video signal from said video signal;

control means for controlling said detail signal forming means on the basis of an output of said signal level detecting means in a manner such that as a signal level of said DC components is low, frequency of said detail signal to be formed by said detail signal forming means becomes lower; and mixing means for mixing said detail signal to said video signal;

wherein said detail signal forming means comprises a first filter for extracting a relatively high first frequency component from said video signal, a second filter for extracting a relatively low second frequency component from said video signal, and frequency component mixing means for mixing an output of said first filter and an output of said second filter at a mixture ratio which is determined on the basis of a control signal that is supplied from said control means; and wherein said frequency component mixing means comprises an extremal value detecting means for detecting a maximal point and a minimal point of the output of said second filter, and mixture ratio holding means for holding the mixture ratio of said frequency component mixing means so as not to change for a predetermined period of time when the maximal point or the minimal point is detected by said extremal value detecting means.

9. An apparatus according to claim 7, further comprising non-linear compressing means for non-linearly compressing the signal level of said video signal, and wherein said detail signal forming means forms said detail signal from the video signal which is not compressed by said non-linear compressing means.

10. An apparatus according to claim 6, wherein said video signal is a digital video signal and a detail signal of said digital signal is formed by a digital signal process.

11. A video camera comprising:

image pickup means for imaging an object and generating a video signal;

signal level detecting means for detecting a signal level of DC components of said video signal;

detail signal forming means for forming a boost frequency to form a detail signal from said video signal;

control means for controlling said detail signal forming means in accordance with an output of said signal level detecting means in a manner such that when the signal level of the DC components is low, said boost frequency of the detail signal becomes lower; and mixing means for mixing said detail signal to said video signal.

12. A video camera according to claim 2, wherein said first filter is a first bandpass filter, and said second filter is a second bandpass filter.

13. A video camera according to claim 7, wherein said first filter is a first bandpass filter, and said second filter is a second bandpass filter.

* * * * *